Feb. 12, 1952 — S. A. HOLMQVIST — 2,585,317
DEVICE FOR TRANSFORMATION OF A MEASURING QUANTITY
INTO MOVEMENTS OF ADJUSTABLE MEMBERS
Filed Jan. 6, 1950

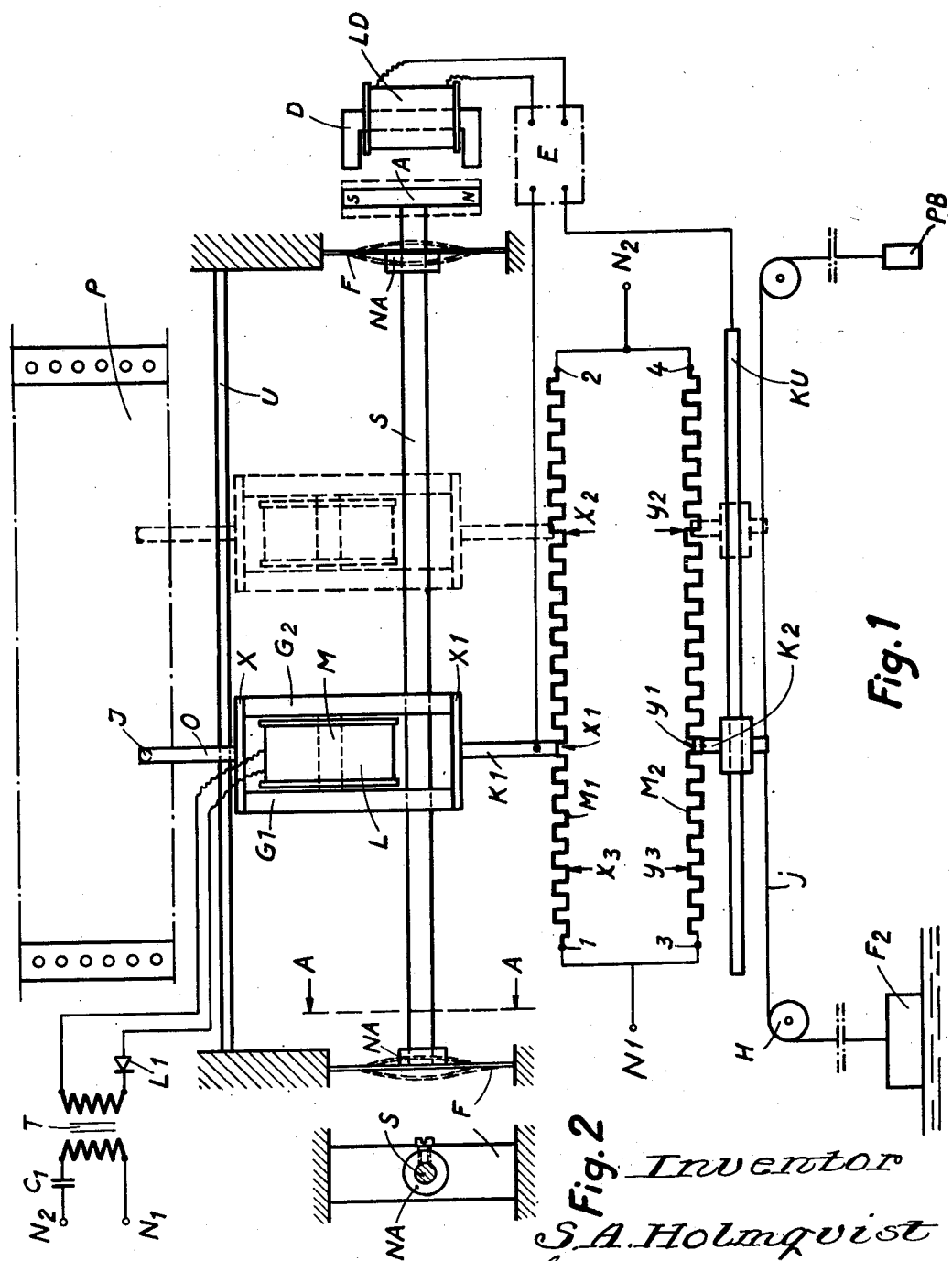

Inventor
S. A. Holmqvist

Feb. 12, 1952    S. A. HOLMQVIST    2,585,317
DEVICE FOR TRANSFORMATION OF A MEASURING QUANTITY
INTO MOVEMENTS OF ADJUSTABLE MEMBERS
Filed Jan. 6, 1950    6 Sheets-Sheet 4

Inventor
S. A. Holmqvist

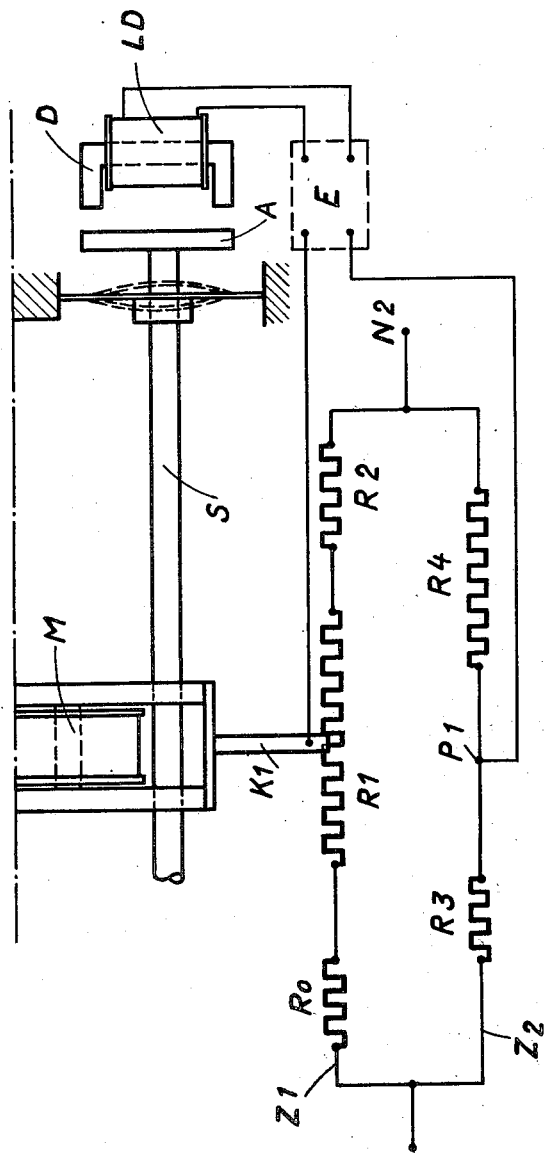

Patented Feb. 12, 1952

2,585,317

UNITED STATES PATENT OFFICE 2,585,317

DEVICE FOR TRANSFORMATION OF A MEASURING QUANTITY INTO MOVEMENTS OF ADJUSTABLE MEMBERS

Seth August Holmqvist, Appelviken, Sweden, assignor to Telefonaktiebolaget L M Ericsson, Stockholm, Sweden, a company of Sweden Application January 6, 1950, Serial No. 137,256
In Sweden February 2, 1949

10 Claims. (Cl. 318—21)

The invention refers to a device for transformation of variations of a measuring quantity into movement of an adjustable member, especially in a registering or indicating member. The object of the invention is to achieve a device of such a kind which is very simple and operates reliably.

Figure 3:
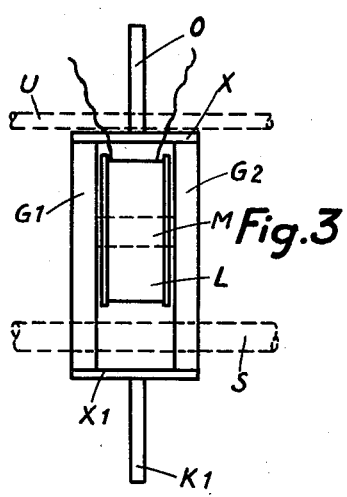
Figure 5:
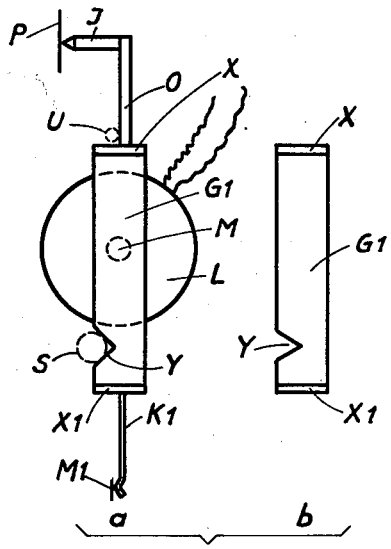
Figure 4:
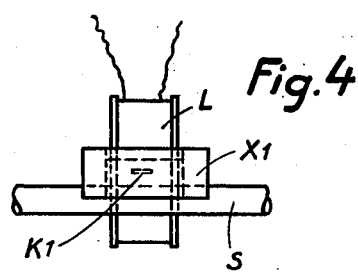
Figure 6:
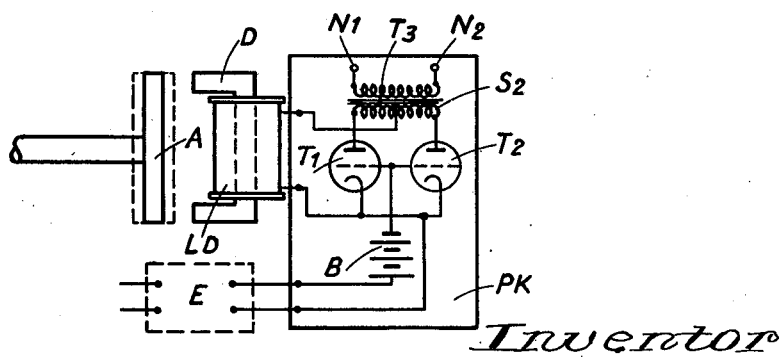
Figure 7:
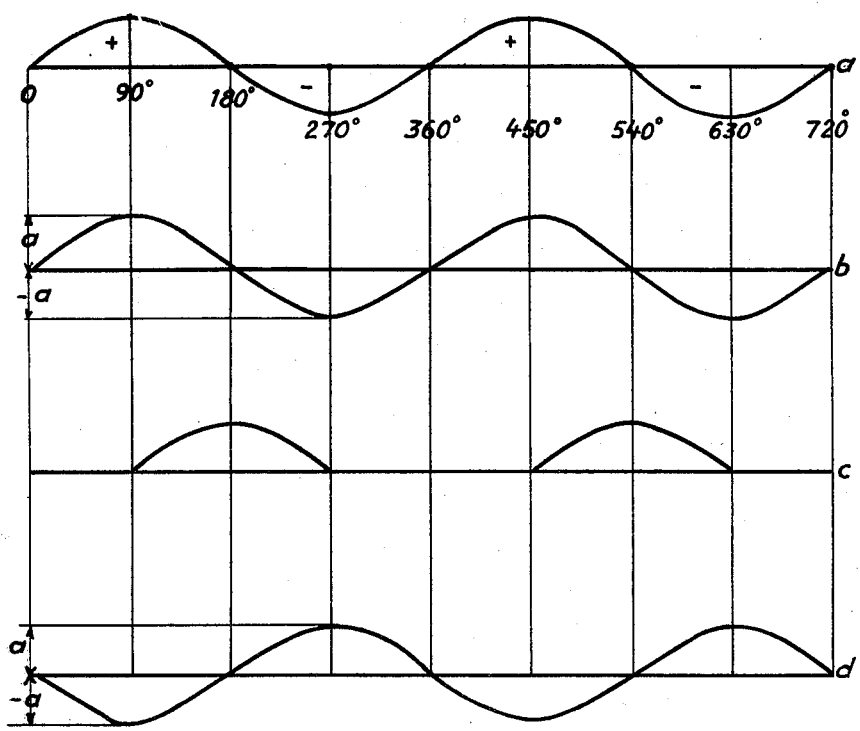
Figure 8:
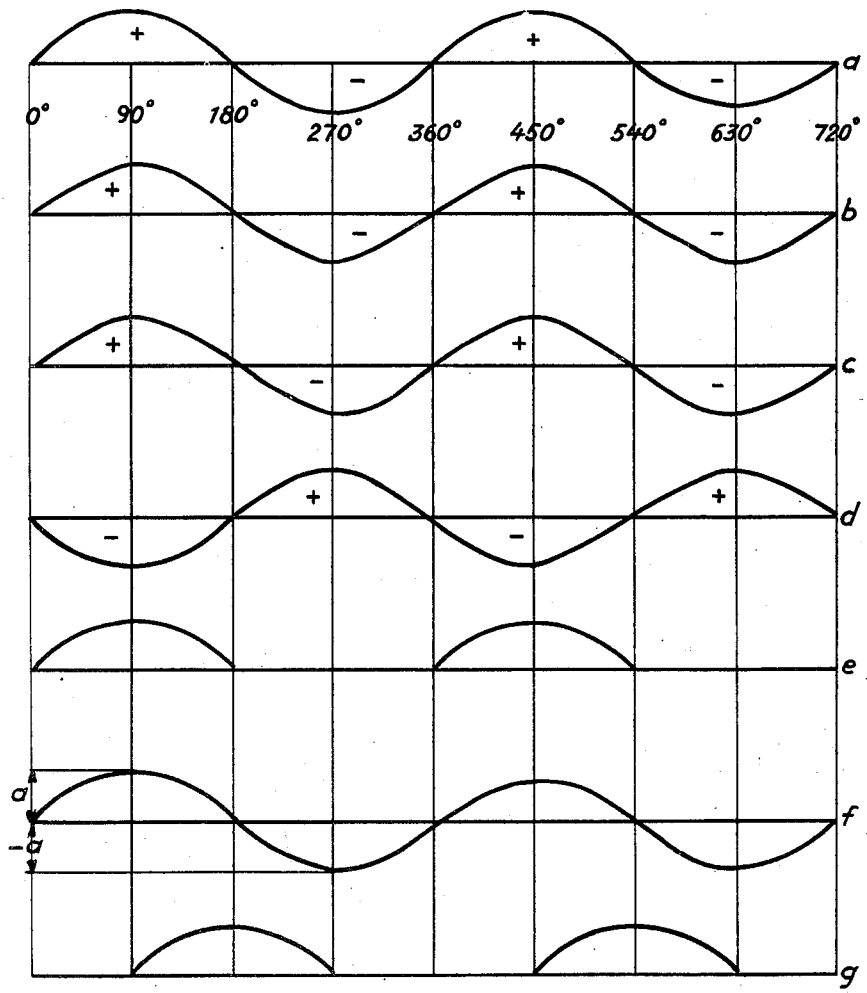
Figure 9:
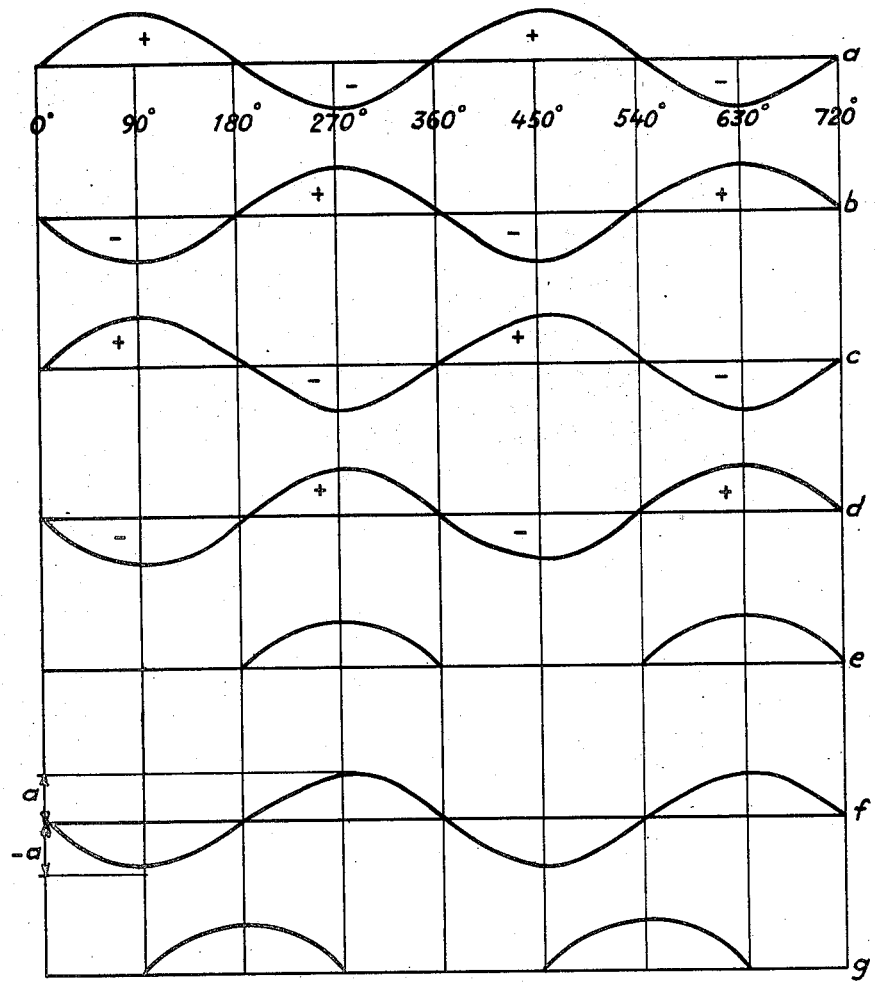

The invention will be described more closely with reference to the accompanying drawings, which show a number of embodiments. Fig. 1 is a schematic view showing the application of the invention to a registering level indicator. Fig. 2 is a section along the line A—A in Fig. 1, and Fig. 3 shows the driving magnet for the registering device as viewed from above. Fig. 4 shows the driving magnet as viewed from in front. Fig. 5a shows the driving magnet as viewed from the side and Fig. 5b is a detail showing one of the branches of the driving magnet as viewed from the side. Fig. 6 shows a connecting device for feeding with current the driving device for the registering member. Figs. 7–9 show voltage and current diagrams and Fig. 10 shows the application of the invention to a device for registering the temperature.

In Figs. 1–4, S is an iron bar having each end fixed in a nave NA fastened in leaf springs F in such a manner that the bar can oscillate freely axially. The driving electromagnet D actuates the armature A fastened in the bar S, which armature consists of a permanent magnet (n—s). G1 and G2 are the two legs of an H-shaped electromagnet M, the winding L of which is placed between said legs. Each one of the legs is provided with a V-shaped groove Y, the edges of which rest against the bar S. The shape of the groove appears from Fig. 5b. At the other end of the electromagnet there is an arm or the like O fastened in a plate X of non-magnetic material, said plate being fixed to the legs G1 and G2. The arm O rests against a bar U which latter is parallel to the bar S. The electromagnet M is thus supported by the bars S and U and can be displaced along said bars, for example from the position shown in fully drawn lines to the position shown in dotted lines. The winding L of the magnet M is supplied from the A. C. source N1, N2 over a transformer T, the primary coil of which is connected in series with the condenser C and the secondary winding of which is connected in series with a half-wave rectifier L1.

A sliding contact K1 on a potentiometer M1 is fixed to a plate X1 of non-magnetic material fastened to the legs G1 and G2 of the magnet M. When the magnet M is displaced along the bar S the contact K1 is pushed along the potentiometer M1.

A second potentiometer M2, electrically connected with the potentiometer M1, is provided with a sliding contact K2, which is displaceable along the bar (KU) and is operated by a float F2 floating on the liquid, the level of which is to be registered, said float being mechanically connected to K2 by means of a wire $j$ over a return pulley H (the wire $j$ is balanced by a counterweight PB). The potentiometers M1 and M2 connected in parallel are connected to said A. C. supply N1, N2. The pencil J is supported by the lever O and rests against the diagram paper P, drawing a curve on said paper when moving.

The apparatus operates in the following manner:

If the winding LD of the driving magnet D is fed with alternating current, the bar S with armature A oscillates axially with the same frequency as the alternating current. The end positions of the armature A are indicated by dotted lines in Fig. 1. At a positive A. C. half period the armature A is for example attracted by the magnet D and at a negative half period the armature is repelled by the magnet D. The bar oscillates about its position of rest with the amplitudes $\pm a$ and in phase with the alternating current.

Fig. 7a shows the voltage curve for said alternating current and Fig. 7b shows a curve of the oscillation of the bar.

The magnet M, which rests against the bars S and U, is fed over the transformer T with alternating current from a supply N1, N2. The condenser C, which is connected in series with the primary winding of the transformer, causes a phase displacement of about 90° between the supply voltage and the secondary voltage of the transformer. The secondary winding of the transformer T is connected in series with the rectifier L1. The current therefore flows through the magnet M as disclosed in Fig. 7c, and every second half period is blocked by the rectifier L1. During the periods, when the magnet M is magnetized, the legs G1 and G2 are attracted to the bar S and the magnet M follows the movement of the bar. When the current through M is broken, the attraction between M and S becomes zero and the magnet M does not follow the movement of the bar, owing to its mass. The magnet M thus follows the movement of the bar during the period from 90° to 270° in Fig. 7b, but keeps resting during the period from 270° to 450°, that is when the bar is oscillated in a direction contrary to the direction in which it was oscillated during the period from 90° to 270°. During the period from 90° to 270° the bar moves from $a$ to $-a$ and during the period from 270° to 450° the bars moves from $-a$ to $a$. Between 450° and 630° the magnet M is attracted by the bar and moves again from $a$ to $-a$ and so on. The result is thus that the magnet M moves a distance $2a$ during each A. C. cycle. If we choose $a=0.5$ mm. the armature is thus displaced $50 \times 2.0 \times 0.5 = 50$ mm. per second at 50 cycle A. C.

The current to the driving magnet D is obtained from the potentiometers M1, M2 in Fig. 1. The two potentiometers M1, M2, connected in parallel, are fed from the same A. C. supply N1, N2 as the magnet M (or at least from an A. C. supply having the same frequency). If K1 and K2 (at a certain position of the float F) are first supposed to assume such positions, for example $x1$ and $y1$, that the voltage between them is zero, the bar S assumes its position of rest and the magnet M does not move. If now the liquid level with the float F rises, K2 is displaced (by the float F changing its position) for example to the position $y2$ (dotted lines), a voltage thereby arising between K1 and K2. This voltage is supposed to be in phase with the voltage from the supply N1, N2. The bar is then oscillated according to Fig. 7b and the magnet M is moved to the right in Fig. 1, K1 thereby being displaced along the potentiometer M1. When the sliding contact K1 reaches such a point, for example $x2$, that the voltage between K1 and K2 becomes zero, the oscillations of the bar are stopped and the magnet M stops in a position corresponding to the new position of the float.

If instead the liquid level falls, so that the float moves the sliding contact K2 to for example the position $y3$ on the potentiometer M2, a voltage arises again between K1 and K2. Since the sliding contact K2 has in this case been moved in the direction contrary to the direction in which the liquid level rose, the alternating voltage between K1 and K2 is 180° out of phase relative the supply voltage N1, N2. This must entail that the bar oscillates according to Fig. 7d, that is with a phase 180° out of phase relative to the phase shown in Fig. 7b. The phase position for the current through the magnet M is unchanged. During the period 90° to 270° the armature is thus moved from $-a$ to $a$ and the same is the case between 450° and 630°. The result is, that the magnet M is now displaced in the opposite direction (opposite to the direction in which the liquid level rose), that is to the left in Fig. 1, until the contact K1 reaches such a position, for example $x3$, that the voltage between K1 and K2 becomes zero and the movement of the bar ceases and the magnet M stops.

The voltage between K1 and K2 being practically too small to feed the driving magnet D, a suitable amplifier E can be connected between the sliding contacts K1, K2 and the magnet D (Fig. 1).

In the device described above, whether it is operated with an amplifier or not, the current through the driving magnet D, and thus also the traction of the magnet D, is dependent on the difference of voltage between the sliding contacts K1 and K2 (Fig. 1). This entails that the oscillatory amplitudes of the bar S become much greater, when the distance between the contacts K1 and K2 is great, if no special arrangements are made to keep the current constant through the driving magnet D. In Fig. 6 a circuit is shown, the object of which is to make it possible to keep constant the current through the winding LD to the driving magnet D, independently of the voltage existing between the sliding contacts K1, K2, except when said voltage is zero, the current through the driving magnet then also being zero. In the circuit shown in Fig. 6 an electron tube aggregate PK (Fig. 6) is connected between the driving magnet D and the amplifier E (or, in case an amplifier is not used, between driving magnet D and the terminals K1, K2), which electron tube aggregate rectifies the A. C. from E (respectively from K1, K2) to D. C. impulses. In this case the armature A consists of a piece of soft iron and not, as in the device shown in Fig. 1, of a permanent magnet. The other details of the moving mechanism are identical with those shown in Fig. 1, and therefore the device in its entirety has not been fully drawn in Fig. 6. The electron tube aggregate according to Fig. 6 is provided with two Thyratron tubes T1 and T2 in balanced circuit, and the winding LD of the driving magnet D is connected between the central tapping on the secondary winding S2 of a transformer T3 (supplied from the same supply N1, N2 as the magnet M) and the cathodes of the Thyratron tubes T1 and T2. The ends of the secondary winding of the transformer T3 are connected to the anodes of the tubes. The grid voltage is partly a constant voltage from a source of current B (D. C. or A. C.), and partly the alternating voltage from the sliding contacts K1 and K2. Said constant and said alternating voltages being connected in series. The source of current B is chosen so (5–10 v.), that the tubes T1 and T2 are blocked and accordingly no current is supplied to the driving magnet D when K1 and K2 are positioned so, that the voltage between them is zero.

If the float F, after having been restored to its normal position, rises and the sliding contact K2 is displaced to the right, the grid is fed with an A. C. voltage which is supposed to lie in phase with the line voltage from N1, N2, according to Fig. 8b. The anode voltage in the tubes are 180° out of phase relative each other, one of them (for example the anode voltage for T1) being in phase with the supply voltage according to Fig. 8c. The anode voltage for tube T2 is shown on Fig. 8d. The anode current through tube T1 is shown on Fig. 8e, whilst the current through tube T2 remains zero, since the grid voltage is negative during the half periods in which the anode of tube T2 is positive. The driving magnet D is thus supplied with rectified A. C. current and attracts the soft iron armature A, together with the bar S, when the magnet is magnetized. The diagram for the current through the magnet M is obtained in the same manner as in Fig. 7 and the wave is shaped as appears in Fig. 8g. During the period 90°–270° the magnet M is thus displaced from $a$ to $-a$ and the same displacement takes place during the period 450° to 630°. The magnet M is thus displaced a portion $2a$ to the right until the sliding contacts K1 and K2 again take such positions, that the voltage between them is zero.

If instead the float F2 sinks, the contact K2 is displaced in the opposite direction relative its direction when the float rose, and corresponding curves are obtained according to Fig. 9 ($a$–$g$). The phase for the part of the grid voltage taken from the contacts K1 and K2 (as appears in Fig. 9b) is now 180° displaced relative the phase in Fig. 8b. The anode voltage curves for tubes T1 and respectively T2 are the same as in Figs. 8c and $d$ and appear from the Figures 9c and $d$.

In this case the current through the tube T1 becomes zero, since the grid voltage is negative during the half cycles, when the anode voltage of tube T1 is positive, while the tube T2 receives current (see Fig. 9e) during the half cycles, in which both the anode and the grid voltage of the tube are positive. These positive half cycles during which current is fed to the winding of the driving magnet D are 180° out of phase relative the same half cycles in Fig. 8e and the oscillations of the bar S (Fig. 9f) are thus 180° out of phase relative the same oscillations in Fig. 8f, the magnet M therefore being displaced from $-a$ to $+a$ during each positive half cycle (Fig. 9g). The magnet M is thus displaced a portion $2a$ to the left during each cycle. Also in this circuit, using thyratron tubes, the magnet M thus attempts to displace the sliding contact K1 to such a position, that the voltage between K1 and K2 becomes zero, and a uniformity is obtained between the movements of the float F and the pencil J.

An example of the application of the invention to another technical field is shown in Fig. 10. In this embodiment the purpose is to register the temperature by means of a resistance thermometer. The details not shown in Fig. 10 are identical with those shown in Fig. 1.

The potentiometer circuit according to Fig. 10 consists of two circuits Z1, Z2 connected in parallel with each other and to the supply terminals N1, N2, Z1 consisting of the resistances R0, R1, R2 connected in series. The sliding contact K1 can be adjusted along the resistance R1. The other circuit Z2 consists of the resistances R3 and R4 connected in series, R3 being a temperature dependent resistance, which is assumed to be placed in a chamber, the temperature of which is to be registered. The winding of the driving magnet D, or possibly an amplifier E connected before the driving magnet, is connected to a fixed contact P1 between the resistances R3 and R4 and to the sliding contact K1. As in the previous figures, D indicates the driving magnet which drives the bar S, and M the magnet which slides on the bar. The voltage between P1 and the sliding contact K1 is determined partly by the resistance value of the temperature dependent resistance R3 and partly by the position of the contact K1 on the resistance R1. The potentiometer circuit is suitably adjusted so that the contact K1 lies about the middle of the resistance R1 and the voltage between K1 and P1 is zero when the temperature, to which the temperature dependent resistance R3 is submitted, is normal. If the temperature rises on R3, its resistance increases and an A. C. voltage is developed between the contacts P1 and K1. This voltage can possibly be amplified in the amplifier E and is then fed to the winding LD of the driving magnet D, which is magnetized and causes the bar S to oscillate as described with reference to Fig. 1. The magnet M then moves along the bar and the contact K1 is displaced until the voltage between P1 and K1 becomes zero again. On the other hand, a decrease of the temperature on R3 gives rise to an A. C. voltage between P1 and K1 which is 180° out of phase relative the voltage in the case just described, that is when the temperature rises on R3, the magnet M therefore now being displaced in the opposite direction (relative said first mentioned case) until the voltage between the contacts P1 and K1 becomes zero again. The magnet M and therewith the pencil J, are thus displaced due to a change of temperature on the temperature dependent resistance R3, said temperature being registered by the pencil J. The resistances R0 and R2 in the potentiometer circuit determine the measuring range of the instrument, and the lesser part of (R0+R1+R2) occupied by R1, the smaller measuring range (in degrees of temperature).

The invention is not limited to registering instruments. It is often desirable to use very large indicating instruments, which can be read from a great distance. Due to the great forces which can be obtained from the driving device in an arrangement according to the invention, the invention can advantageously be used also in relation with indicating instruments. The magnet M is then mechanically connected to a large pointer indicating the result on a round or straight scale.

The invention can also be applied to devices for regulating purposes. A mercury switch can then be placed in the path of movement of the magnet M in such a manner, that the magnet M, when in a certain position, actuates the switch which then, for example with devices for temperature regulation of an oven, disconnects or connects the oven effect.

I claim:

1. In an apparatus for the transformation of the variations of a quantity to be measured into movements of an adjustable member, comprising a source of alternating current, a rectifier for rectifying said alternating current to pulsating direct current, a bar of ferromagnetic material resiliently supported for axial movement, an armature mounted on said bar, a driving electromagnet mounted adjacent said armature and capable of attracting said armature and bar in the longitudinal direction of the latter, means responsive to variations in said measured quantity for supplying pulsating direct current from said rectifier to the winding of said electromagnet in accordance with the sense of said variations, an additional electro-magnet having an armature positioned adjacent said bar, guide means for mounting said additional electromagnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

2. In an apparatus for the transformation of the variations of a quantity to be measured into movements of an adjustable member, comprising a source of alternating current, a bar of ferromagnetic material resiliently supported for axial movement, an armature mounted on said bar, a driving electro-magnet mounted adjacent said armature and capable of attracting said armature and bar in the longitudinal direction of the latter, means responsive to variations in said measured quantity for supplying current from said alternating current source to the winding of said electro-magnet in accordance with the sense of said variations, an additional electro-magnet having an armature positioned adjacent said bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

3. In an apparatus for the transformation of the variations of a quantity to be measured into movements of an adjustable member, comprising a source of alternating current, a bar of ferromagnetic material resiliently supported for axial movement, an armature mounted on said bar, a driving electro-magnet capable of attracting said armature and bar in the longitudinal direction of the latter, a bridge circuit having two input terminals connected to said source of alternating current, and two tapping terminals connected to the winding of the driving electro-magnet, one of said tapping terminals consisting of a sliding contact mechanically connected to said electro-magnet, means responsive to variations in said measuring magnitudes for unbalancing said bridge circuit, an additional electro-magnet having an armature located adjacent said bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

4. In an apparatus for the transformation of the variations of a quantity to be measured into movements of an adjustable member, comprising a source of alternating current, a bar of ferromagnetic material resiliently supported adjacent its ends for axial movement, an armature mounted on said bar, a driving electro-magnet mounted adjacent said armature and capable of attracting said armature and bar in the longitudinal direction of the latter, means responsive to variations in said measured quantity for supplying current from said alternating current source to the winding of said electro-magnet in accordance with the sense of said variations, an additional electro-magnet having an armature positioned adjacent said bar, guide means for mounting said additional electro-magnet for slidable movement in the longitudinal direction parallel to the axis of said bar, a supply circuit for said additional electro-magnet including a transformer having its primary connected to said source of alternating current, a condenser in series with said primary, a half wave rectifier in the secondary circuit of said transformer for rectifying the current from the said source of alternating current supply, said secondary circuit being connected to the winding of said last mentioned electro-magnet.

5. In an apparatus for the transformation of the variations of a quantity to be measured into movements of an adjustable member, comprising a source of alternating current, a bar of ferromagnetic material resiliently mounted adjacent its ends for axial movement, an armature mounted on said bar, a driving electro-magnet mounted adjacent said armature capable of attracting said armature and bar in the longitudinal direction of the latter, means responsive to variations in said measured quantity for supplying current from said alternating current source to the winding of said electro-magnet in accordance with the sense of said variations, an additional electro-magnet having an armature positioned adjacent said bar, guide means for mounting said additional electro-magnet for slidable movement in the longitudinal direction parallel to the axis of said bar, means for energizing said last mentioned electro-magnet from said source of alternating current with alternating current of the same frequency but approximately ninety degrees out of phase with respect to said source, a half wave rectifier for rectifying the current from said source of alternating current and a circuit for supplying the rectified current from said source of alternating current to the winding of said last mentioned electro-magnet.

6. In an apparatus for the transformation of the variations of a quantity to be measured into movements of an adjustable member, comprising a source of alternating current, a bar of ferro-magnetic material resiliently supported adjacent the ends for axial movement, an armature mounted on said bar, a driving electro-magnet capable of attracting said armature and bar in the longitudinal direction of the latter, a bridge circuit having two input terminals connected to said source of alternating current and two tapping terminals comprised by sliding contacts connected to the winding of the driving electro-magnet, one of said tapping terminals being mechanically connected to the electro-magnet, and means connected to the other sliding contact responsive to variations in said measuring magnitudes for displacing said sliding contact along one of the resistances of the bridge in accordance with said variations, an additional electro-magnet having an armature located adjacent said bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

7. In an apparatus for the transformation of the variations of a quantity to be measured into movements of an adjustable member, comprising a source of alternating current, a bar of ferro-magnetic material resiliently supported adjacent its ends for axial movement, an armature mounted on said bar, a driving electro-magnet capable of attracting said armature and bar in the longitudinal direction of the latter, a bridge circuit having two input terminals connected to said source of alternating current, and two tapping terminals, one of said tapping terminals consisting of a sliding contact mechanically connected to the winding of the driving electro-magnet, an electron tube aggregate including two gas filled electron tubes in balanced circuit to which the tapping terminals are connected, the output terminals of said rectifier being connected to the driving electro-magnet, a circuit for supplying anode voltage to said electron tubes from the same source as the driving electro-magnet, and a circuit for supplying grid voltage to said vacuum tubes including the combined input voltage and a source of constant voltage, means responsive to variations in said measuring magnitudes for unbalancing said bridge circuit, an additional electro-magnet having an armature located adjacent said bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

8. In an apparatus for the transformation of the variations of a quantity to be measured into movements of an adjustable member, comprising a source of alternating current, a bar of ferro-magnetic material resiliently supported adjacent its ends for axial movement, an armature mounted on said bar, a driving electro-magnet mounted adjacent said armature and capable of attracting said armature and bar in the longitudinal direction of the latter, means responsive to variations in said measured quantity for supplying current from said alternating current source to the winding of said electro-magnet in accordance with the sense of said variations, an additional electro-magnet having an H shaped frame with parallel legs adapted to rest against said bar and having aligned notches therein adapted to receive said bar and an armature positioned adjacent said bar, guide means positioned parallel to said bar for supporting the frame and the winding of the last mentioned electro-magnet conjointly with said bar, an additional source of alternaitng current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

9. In an apparatus for the transformation of the variations of a quantity to be measured into movements of an adjustable member, comprising a source of alternating current, a bar of ferro-magnetic material resiliently supported adjacent its ends for axial movement, an armature mounted on said bar, a driving electro-magnet capable of attracting said armature and bar in the longitudinal direction of the latter, a bridge circuit having two input terminals connected to said source of alternating current, and two tapping terminals, an amplifier connected between said tapping terminals and the winding of the driving electro-magnet, one of said tapping terminals consisting of a sliding contact mechanically connected to said electro-magnet, means responsive to variations in said measuring magnitudes for unbalancing said bridge circuit, an additional electro-magnet having an armature located adjacent bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

10. In an apparatus for the transformation of the variations of a quantity to be measured into movements of an adjustable member, comprising a source of alternating current, a bar of ferro-magnetic material resiliently supported adjacent its ends for axial movement, an armature comprised by a permanent magnet mounted on said bar, a driving electro-magnet mounted adjacent said armature and capable of attracting said armature and bar in the longitudinal direction of the latter, means responsive to variations in said measured quantity for supplying current from said alternating current source to the winding of said electro-magnet in accordance with the sense of said variations, an additional electro-magnet having an armature positioned adjacent said bar, guide means for mounting said additional electro-magnet for slidable movement in the longitudinal direction parallel to the axis of said bar, an additional source of alternating current having the same frequency but approximately ninety degrees out of phase relative to said first mentioned source of alternating current, a half wave rectifier for rectifying the current from said last mentioned source of alternating current and a circuit for supplying the rectified current from said last mentioned source to the winding of said last mentioned electro-magnet.

SETH AUGUST HOLMQVIST.

REFERENCES CITED

The following references are of record in the file of this patent:

UNITED STATES PATENTS

| Number | Name | Date |
| --- | --- | --- |
| 827,182 | Rittmeyer | July 31, 1906 |
| 2,275,317 | Ryder | Mar. 3, 1942 |
| 2,310,955 | Hornfeck | Feb. 16, 1943 |
| 2,349,963 | Harrison | May 30, 1944 |
| 2,412,263 | Hartig | Dec. 10, 1946 |